US007268680B2

(12) United States Patent
Gary, Jr.

(10) Patent No.: US 7,268,680 B2
(45) Date of Patent: Sep. 11, 2007

(54) ELECTRONIC IDENTIFICATION TAG WITH ELECTRONIC BANDING

(75) Inventor: Wyndham F. Gary, Jr., Whitefish Bay, WI (US)

(73) Assignee: RF Technologies, Inc., Brookfield, WI (US)

( * ) Notice: Subject to any disclaimer, the term of this patent is extended or adjusted under 35 U.S.C. 154(b) by 202 days.

(21) Appl. No.: 10/872,044

(22) Filed: Jun. 18, 2004

(65) Prior Publication Data

US 2005/0073419 A1 Apr. 7, 2005

Related U.S. Application Data

(60) Provisional application No. 60/509,135, filed on Oct. 6, 2003.

(51) Int. Cl.
*G08B 1/08* (2006.01)
*H04Q 7/00* (2006.01)

(52) U.S. Cl. .................................. 340/539; 340/539.15

(58) Field of Classification Search .............................. 340/539.1–539.25, 539.3, 573.3, 573.4; 455/100
See application file for complete search history.

(56) References Cited

U.S. PATENT DOCUMENTS 4,792,796 A * 12/1988 Bradshaw et al. ..... 340/539.21
5,369,800 A * 11/1994 Takagi et al. ................. 455/59
5,461,365 A * 10/1995 Schlager et al. ......... 340/573.4
5,778,309 A * 7/1998 Tuttle et al. ............. 455/127.2
5,793,290 A 8/1998 Eagleson et al.
5,883,576 A 3/1999 De La Huerga
5,912,623 A 6/1999 Pierson
5,973,600 A * 10/1999 Mosher, Jr. .............. 340/572.8
6,043,746 A 3/2000 Sorrells
6,286,102 B1 9/2001 Cromer et al.
6,329,918 B1 12/2001 Moyer
6,380,860 B1 4/2002 Goetz
6,408,330 B1 6/2002 DeLaHuerga
6,539,393 B1 3/2003 Kabala
6,542,114 B1 4/2003 Eagleson et al.
6,563,417 B1 5/2003 Shaw
6,563,423 B2 5/2003 Smith
6,570,504 B2 5/2003 Rabanne et al.
6,570,506 B2 5/2003 Lemp, III
6,570,507 B1 5/2003 Lee et al.
6,573,832 B1 6/2003 Fugere-Ramirez
6,573,835 B2 6/2003 Irizarry et al.
6,573,838 B2 6/2003 Christie
6,580,357 B1 6/2003 Forster et al.
6,580,363 B1 6/2003 Wilson
6,583,729 B1 6/2003 Gardner et al.
6,590,497 B2 7/2003 Chandar
6,590,499 B1 7/2003 D'Agosto
6,593,845 B1 7/2003 Friedman et al.

(Continued)

OTHER PUBLICATIONS

U.S. Appl. No. 60/509,135, titled "Electronic Identification Tag With Electronic Banding", filed Oct. 6, 2003 (29 total pages).

*Primary Examiner*—Benjamin C. Lee
*Assistant Examiner*—Jennifer Mehmood
(74) *Attorney, Agent, or Firm*—Foley & Lardner LLP

(57) ABSTRACT

A tag unit is disclosed. The tag unit comprises of transmitting unit and a banding material coupled to the transmitting unit. A radio frequency and identification (RFID) circuit is coupled to the transmitting unit and the banding unit.

27 Claims, 5 Drawing Sheets

U.S. PATENT DOCUMENTS

| | | | | |
|---|---|---|---|---|
| 6,593,850 | B1 | 7/2003 | Addy | |
| 6,597,292 | B1 | 7/2003 | Shigyo | |
| 6,600,407 | B2 | 7/2003 | Pack | |
| 6,600,418 | B2 | 7/2003 | Francis et al. | |
| 6,600,423 | B1 | 7/2003 | Rozier et al. | |
| 6,603,387 | B1 | 8/2003 | Addy et al. | |
| 6,603,399 | B1 | 8/2003 | Rührig | |
| 6,606,027 | B1 | 8/2003 | Reeves et al. | |
| 6,606,035 | B2 | 8/2003 | Kapadia et al. | |
| 6,608,551 | B1 | 8/2003 | Anderson et al. | |
| 6,611,198 | B1 | 8/2003 | Geiszler et al. | |
| 6,614,349 | B1 | 9/2003 | Proctor et al. | |
| 6,614,351 | B2 | 9/2003 | Mann et al. | |
| 6,617,963 | B1 | 9/2003 | Watters et al. | |
| 6,617,970 | B2 | 9/2003 | Makiyama et al. | |
| 6,617,971 | B2 | 9/2003 | Keller | |
| 6,621,417 | B2 | 9/2003 | Duncan et al. | |
| 6,745,008 | B1 * | 6/2004 | Carrender et al. | 455/41.1 |
| 6,753,781 | B2 * | 6/2004 | Radomsky et al. | 340/573.4 |
| 6,753,782 | B2 * | 6/2004 | Power | 340/573.4 |

* cited by examiner

ELECTRONIC IDENTIFICATION TAG WITH ELECTRONIC BANDING

CROSS-REFERENCE TO RELATED PATENT APPLICATION

This Application is an Application claiming the benefit under 35 U.S.C. § 119(e) U.S. application Ser. No. 60/509,135, filed Oct. 6, 2003, incorporated herein by reference in its entirety.

BACKGROUND

The present invention relates to systems and methods for matching and maintaining correlation between a parent and an infant within an environment such as a hospital.

The present invention aids in assuring that an infant or infants born to a mother remain matched with their mother when the mother and infant(s) leave the hospital or when the infant or infant and mother are separated and then are properly re-matched in the hospital.

The possible abduction of an infant or child from medical facilities, such as hospitals, other medical structures, temporary housing and other restricted areas has created a significant demand for monitoring systems which signal any unwarranted movement of the infant or child from the assigned environment or area. The standard method used heretofore, such as visitor passes, monitoring cameras, and standard door monitors have not provided the necessary protection against such unwarranted movement of personnel, and particularly an infant or child, from an assigned or restricted area. Hospitals and like facilities are thus continuously looking for improved systems which will essentially prevent unwarranted movement and abduction of an infant or child, thereby maintaining a very safe and secure environment for the infants and other such personnel. The present invention has been particularly developed in relation to an infant and a parent and is therefore described with reference thereto. The systems and methods may, of course, be applied to other persons or objects and even other applications.

Systems have been proposed in which an alarming band unit is connected to the monitored child. The restricted area includes strategically located receivers throughout the restricted area. The receivers are responsive to the output of the alarming band unit and coupled to one or more controllers. The alarming band unit includes a transmitter unit for establishing a control signal when the band unit is moved adjacent to an alarm receiver. The band alarming unit is constructed such that any tampering or removal of the alarming band unit also generates a wider area alarm signal. The local area receivers are small units, which are suitably mounted adjacent to the strategic location, such as a door, hall, elevator, or the like, and are generally interconnected to an alarm control unit. The receivers are generally mounted to a wall, ceiling, or other similar locations and are hard wired to a controller unit. The latter, in turn, is generally mounted in the restricted area and coupled to alarm or alert units mounted for signaling the staff, such as the nursing staff and security personnel as well as providing certain interlocks to restrict movement of the monitored child. Generally, if the alarming band unit is compromised in any way, the transmitter sends the signal to additional, wide area receivers and/or detects the loss of the signal and will immediately generate an appropriate response, which may be an alarm transmission to other remote locations, and the like.

Various systems have been suggested. For example, U.S. Pat. No. 5,014,040, to Weaver, discloses a personal locator adapted to be mounted to the wrist or leg of the infant or any other monitored person. The locator consists of a small transmitter having an attachment band integrally secured to the transmitter housing, which preferably has the appearance of a wristwatch or the like. The integrally connected band is adapted to be wrapped about the arm and then secured within an opening within the opposite side of the transmitter housing. The band itself has embedded therein conductors which are interconnected to the transmitter at the integral connection and also through a releasable connector at the opposite strap connector which receives the free end of the attachment strap. The transmitter generates a unique identification code information or the like, which is transmitted with sufficient power to cover the restricted area in which receivers are mounted directly or as a result of selected movement within an area.

Some prior art systems use alternate systems of monitoring. For example, U.S. Pat. No. 6,211,790, to Radomsky, uses both infrared (IR) and radio frequency (RF) for monitoring purposes. As shown in U.S. Pat. No. 6,211,790, a dual-mode infrared/radio frequency (IR/RF) transmitter is secured within a wristband worn by the mother and within an ankle and/or wristband worn by the infant. In a matching mode of operation, IR signals are received by infrared receivers located within various rooms of a hospital to precisely and automatically determine by proximity that mother and infant are correctly united. In a presence detecting mode, RF signals from the infant's badge are detected by RF receivers located throughout the maternity ward of the hospital or throughout the hospital generally. In a security mode, RF receivers located proximate exits of either of the maternity ward and/or the hospital detect RF signals from the ankle and provide a signal to generate an alarm.

Some systems use a transponder system wherein a non-transmitting individual personalized unit is secured to the person. The unit transmits a coded signal upon being interrogated by a remote detector or a remote monitoring unit. Alternatively, a portable self-contained transmitting and receiving device is worn by the personnel, and when it enters into a selected area, it activates a control unit to effect an alarm condition. Under an alarm condition, an audible or visual signal may be generated at one or more locations. In addition, various securing action may be taken, such as locking of a door, deactivating of an elevator system, providing notifications at local and remote stations, as well as any other option, which may be desired to be incorporated into a system to secure the locations as well as protect the personnel.

Authorized personnel will normally have deactivation systems which permit them to undertake normal personnel servicing and the like. In addition, it is highly desirable to prevent tampering with the system, particularly the child attached unit and the receiver units. Thus, any unauthorized attempt to remove the unit from the person being monitored, or tampering therewith in such a manner as to defeat the security system, must automatically create an alarm or an alert condition for appropriate monitoring and action.

Although various systems presently exist in personal monitoring systems, many of which are particularly directed to the monitoring of movement of infants and children in hospitals and other like areas or facilities, there is a continuing need for reliable security systems which are highly cost effective. Both the monitor unit attached to the person as well as the monitoring sensors must be secure and effective under essentially all positioning and movements of the monitored person. Furthermore, the monitoring systems need to be adaptable to the specific person so that the systems can be better utilized to protect the individual.

U.S. Pat. No. 5,793,290 to Eagleson, incorporated herein by reference, was such a design that efficiently monitors children and infants in hospitals and other like areas or facilities. In Eagleson, a security system for monitoring movement of persons in a secured area including set openings which includes area and opening monitors, tag units and an alarm system is disclosed. The tag unit has special end clamp members that securely clamp an attachment strap to a housing for attaching the unit to a person. Tampering with the connection creates an alarm state. The tag unit includes a dual transmitter continuously transmitting very low frequency (VLF) signal and transmitting a very high frequency (VHF or UHF) signal only if the tag unit is tampered with. The opening monitor includes VLF receivers responsive to a VLF signal and transmitting an alarm signal to an opening alarm system to prevent unauthorized exit. Authorized personnel have a deactivation unit for timed receiver disabling for moving the person through the opening. The UHF transmitter is activated upon unauthorized tampering with the attached tag. A bank response alarm includes a plurality of distributed VHF or UHF receivers that responds to the VHF or UHF signal of any tag unit. A deactivation control is provided to authorized personnel to permit attachment and removal of the tag unit. Other interlocks may be provided including visual and/or audible alarms, tag identification and, data recording.

Accordingly, there is a need for a tag system which when the mother and infant are matched provides both visual and audible indications of a match. Further, there is a need for a mother/infant matching system in which a tag is banded to a patient using an electronic banding material. Further, there is a need for a tag system in which the electronic banding material includes a radio frequency identification (RFID) device that stores identification information. There is a need for a tag system in which the electronic banding material includes a conductor that completes a circuit. Further still, there is a need for a tag system in which the conductor is an antenna. Yet further still, there is a need for a tag system in which the electronic banding material includes multiple layers including a printable layer and an electronic layer. Yet further still, there is a need for an electronic banding material in which the RFID chip may be programmed prior to banding. Yet further still, there is a need for an electronic banding material in which the printable layer is printed with some of the same information that is stored in the RFID chip. Yet further still, there is a need for an electronic banding material that allows reading and writing between the RFID and the tag electronics. Yet further still, there is a need for an electronic banding material that enables reading and writing between the tag and the RFID using RF energy.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

What is provided is a mother and infant matching and security system. The system comprises a first tag unit adapted to be secured to an infant. The first tag unit is operable to transmit a first signal having a low frequency and a second signal having a very high frequency. The system also comprises a second tag unit adapted to be secured to a mother of the infant. The second tag unit has a radio communications link with the first tag unit. Further, the system comprises a communications protocol used by the first tag unit to communicate via the radio communications link with the second tag unit. Further still, the system comprises a radio frequency identification (RFID) circuit coupled to at least one of the first and second tag units.

Also provided is a method of identifying two matching persons or objects. The method comprises securing a first tag unit to a first person or object. The first tag unit has a transmitting unit and a radio frequency identification (RFID) circuit. The method also comprises securing a second tag unit to a second person or object. The second tag unit has a radio communications link with the first tag unit. Further, the method comprises communicating using a predefined communications protocol from the first tag unit to the second tag unit via a radio communications link. Further still, the method comprises identifying a match of the first tag unit and the second tag unit.

Further, provided is a tagging and identification system. The system comprises a first communication network and a server coupled to the first communications network. The system also comprises a tag unit receiver coupled to the first communications network. Further still, the system comprises of first tag unit adapted to be secured to an infant. The first tag unit is operable to transmit a first signal. The first tag unit comprises a radio frequency identification (RFID) circuit. Further still, the system comprises a first tag unit adapted to be secured to a infant. Further still, the system comprises a second tag unit adapted to be secured to a mother of the infant. The second tag unit has a radio communications link with the first tag unit. Yet further still, the system comprises of a communications protocol used by the first tag unit to communicate via the radio communications link with the second tag unit.

Yet further still, what is provided is a tag unit. The tag unit comprises a transmitting unit. The tag unit also comprises a banding material coupled to the transmitting unit. Further, the tag unit comprises of radio frequency identification (RFID) circuit coupled to the transmitting unit and the banding unit.

Alternative examples and other exemplary embodiments relate to other features and combination of features as may be generally disclosed.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED AND EXEMPLARY EMBODIMENTS

Figure 1:
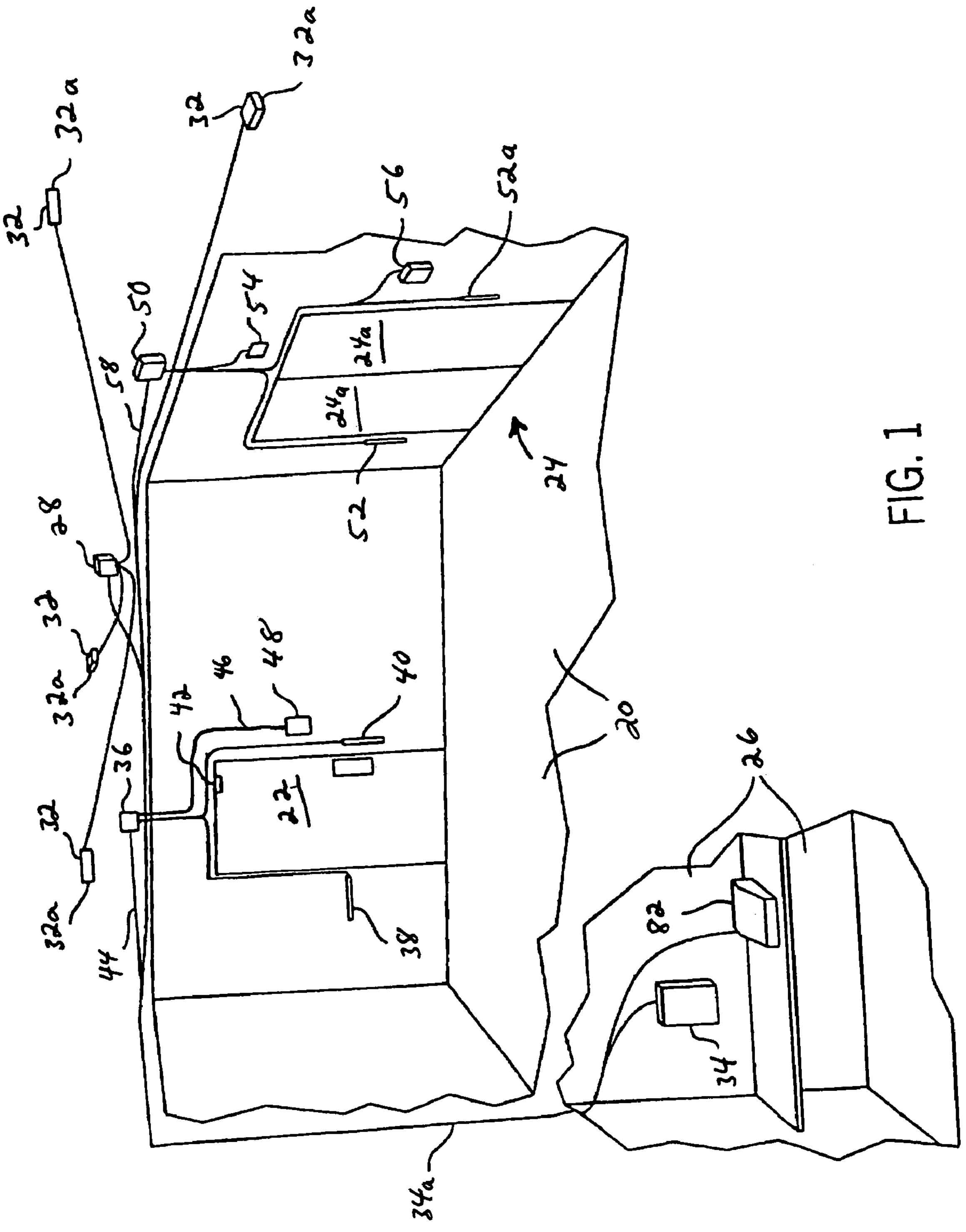
FIG. 1 is a diagrammatic illustration of a secure area incorporating a security system constructed in accordance with an embodiment of the present invention.

Before describing, in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

An exemplary embodiment of the invention is directed to a system having a dual transmitting monitor or tag unit coupled to the monitored child and having distinct dual signal modes in combination with strategically located receiving units and controllers to separately respond to the dual signals. Thus, generally a small tag unit includes a dual signal transmitting system establishing two distinctly different signals, the tag unit includes an attachment band or strap for interconnection to the child, other personnel or object to be monitored with the dual tag unit. The strap is specially coupled to the transmitting unit such that any removal of or separation within the strap results in the transmission of a unique wide area alarm signal. The alarming strap signal may be transmitted over a wide area to simultaneously monitor a plurality of different tag units, each having a proper connection of the strap to a child. The transmitting unit also transmits a much more restricted area signal which only activates receivers at selected locations and thereby the movement of the banded child at certain locations in the restricted area, and particularly into an entry/exit location. Thus, if the alarming strap is cut, the system wiring tampered with, or just removed without deactivation of the system, an alarm signal is automatically and promptly created. If the child, however, properly wearing the dual tag unit moves into a restricted area, the strategically located receiver unit will instantly respond, subject to any desired delay or override features built into the system, and then creates an alarm or alert condition.

More particularly, in accordance with the teaching of an exemplary embodiment of the present invention, the alarming tag unit includes a battery operated RF transmitter. In a preferred construction, the tag unit includes a lightweight, waterproof transmitting housing connected by a hypoallergenic band or strap for attachment to the child. The strap is interconnected at the opposite ends to the sides of the housing with at least one releasable connector, and preferably opposite strap connectors, to secure the band to the housing and thereby attach the tag unit in a comfortable manner to the child with any excess band trimmed and removed. The transmitter is sealed within the housing, with the circuit connection completed through wiring within the strap. Any opening of the connection to either side or otherwise interfering with the strap, such as cutting of the strap, will trigger an alarm condition. This ensures continuous operation of the transmitter units and response by the system monitors. The receiver units are secured to the entrance/exit locations such as a doorway, hallway, elevator or the like.

In accordance with an exemplary embodiment, the circuit may be made using one or more conductors in the strap. One or more of the conductors may be an antenna for the tag unit. Further, the strap may include an RFID device for providing information to the tag or to other devices configured to read the RFID device. The RFID device may include a writeable memory. One or more of the conductors in the strap or banding material may be an antenna for the RFID device.

A battery operated electronic identification tag connects to an electronic banding material. The electronic banding material is used to complete a circuit. The electronic banding material may be used to provide identification information, such as but not limited to patient information to the tag, and/or to other devices. Further, the electronic banding material may be used to encode information such as but not limited to patient information into the electronic banding material. Further still, the electronic banding material may provide an indication if the banding material is disconnected from the tag by tampering or is intentionally removed. Conventional systems have not included information embedded in a RFID device within the banding material, nor have conventional systems used conductors which may double as the antenna for at least one of the tag device or the RFID chip device.

An example of the invention relates to a tag system. The tag system comprises a tag unit adapted to be secured to a patient. The tag unit includes a banding material which comprises a RFID device.

Another example of the invention relates to a tag system. The tag system comprises a tag unit adapted to be secured to a patient. The tag unit includes a banding material which comprises an antenna that completes a circuit to the tag unit and thus identifies when the circuit is broken.

In accordance with an exemplary embodiment, the alarming tag unit includes a first transmitter operating at a high frequency, and preferably ultra high frequency (UHF). The UHF transmitter is normally in an off condition although a signal may be transmitted on a periodic basis for supervision purposes. Any tampering with the band or strap of the tag unit, however, immediately creates the UHF signal which is transmitted throughout the restricted area and is received by any one of the UHF receivers and establishes the alarm alert condition. A second transmitter, however, continuously operates and generates a low frequency signal and preferably a very low frequency (VLF), which is confined to a well-defined zone about the child. Use of VLF is desirable as it prevents the shielding of the signal with the body of some person who inadvertently or intentionally attempts to separate and interfere with the transmission of the monitor signal to the receiving units at any entrance/exit location.

Generally, the VLF signal will be below the AM broadcast band. In contrast, the high frequency signal will be an ultra high frequency (UHF) signal substantially above the AM broadcast band.

In addition, selected authorized personnel are provided with a deactivation unit that will deactivate the particular strategically located receiver units to permit removal of the monitor from the child and further permits necessary removal of the person from the secured area. Thus, in a hospital, nursing staff may be required to remove an infant or child for additional medical attention or procedure. The bypass feature also allows re-entry into the restricted area. The deactivation system also allows the removal of the alarming band unit. The strap itself is readily removed and disposed of, while the transmitter is preferably a sealed unit, which can be readily cleaned for reuse.

In an exemplary construction, the basic alarm system for infant and child security and the like, will include three basic elements consisting of 1) a perimeter exit system; 2) a cut/removed band or strap detection system; and 3) a display/alarm/monitoring system. In systems particularly applied to infant and child monitoring, a small transmitting unit appropriate to their size is provided. In order to accommodate this relatively small size, at least two receivers for a single door, and four receivers for double doors, generally mounted orthogonally to each other, and the like are applied as a minimum to the perimeter of the door system and thereby improves the signal pickup as well as eliminating an orientation problem. The monitoring system may include interlocking control systems. For example, a door exit may have an interlock that will limit an alarm response to the actual attempt to open the door. This may be necessary in a secure system where the infant or child would necessarily move near an alarm door for certain reasons, for example, a door located along a busy hallway within the secured area.

Magnetic door locks are often used in areas to selectively lock a door under an alert condition, with the alarm set upon actual opening of the door. Because of fire safety codes and the like, the "maglock" unit must release after a very short period if continuous pressure is applied to the door. Actual opening will then affect the local alarm conditions.

The band alarm control system preferably uses a multiple and overlapping receiver cells system, similar to the concept of cellular radio systems. This ensures reception of the high frequency alarm signal. Thus, a controller for the system is located with the receivers in the ceiling, sides, and the like, and the alarm will lock local and remote sites, and are then generally reset only from the remote site to a local area. If desired, local reset can be provided.

In addition to the basic lock and control system, various options can be provided such as display at various combinations of local and remote alarm stations.

Further, the local alarms can be coded to distinguish between controllers and each controller can be separately or uniquely coupled to drive a remote panel, which displays the controller location to one or more alert panels. Individual identification labels can be applied and displayed at a desired alert panel structure, such as a common "Visinet" console, which may or may not have a printing system attached for purposes of maintaining a printed record of the outputs. Systems with such a cable terminal output can, of course, also provide input into a main console computer for various functions related to the security and record purposes. The display can also provide for display of the system through use of appropriate software which will not only lay out the system but separately identify the location of an alarm site, and if necessary or desired, appropriate recording thereof, in detail, as well as providing visual indication of the location by infant number, name and the like. The system can include voice alarm as well as wireless paging systems.

Various combinations of the system can be applied to the multiplicity of particular requirements of the facilities to maintain maximum degrees of specifications of security as desired and required.

The system also incorporates a matching system for a mother and an infant. When the mother is brought into the hospital, a device initializes a tag that the mother will wear. The tag is then linked to a tag the infant will wear. During the hospital stay, a signal will be given whether the mother and child match when the mother's tag is brought near the infant's tag. The tags will be linked until the mother and infant are discharged from the hospital, at which time they are erased.

The initialization/erasure component of the system contains a key lock, to ensure that the information for a mother-infant is not tampered with. The system uses a computer program to keep a record of each time a child is matched to a mother, and display any alarm or warning events, from the initialization of the system to the discharge of the mother and infant. Additionally, the system can be programmed for a mother to be linked to multiple infants.

The system can also be utilized to store personal information for the mother and infant. For instance, the patient's blood type could be stored in the transmitter. The transmitter would be brought near a unit of blood. If the patient's blood type matched the type of the unit of blood, a positive indication would show, whereas if the blood types did not match, there would be a negative warning.

In summary, the present invention provides an alarm monitoring system for providing safe and secure environments, particularly for newborns and children, parents and medical staff within a secured facility based on a cost effective combination of a dual transmitting tag unit attached to the person and a plurality of receivers appropriately located within the secured areas and responsive to tampering of the tag unit and unauthorized movement of the monitored persons.

FIG. 1 is a diagrammatic illustration of a 20 hospital or other area 20 in which infants and children may be temporarily housed after birth or while receiving medical care and the like, and which is generally desirably provided with security features to protect from abduction or wandering of the infant or child. A protected area 20 has a door 22 for entering and exiting the area. Other entrance/exit points might include an elevator 24 with doors 24A. The various rooms and other areas associated with infant care and housing generally include a suitable communication system to a control station, e.g., a nurse's station, a main security station or the like, shown at 26.

Still referring to FIG. 1, a high frequency controller 28 is mounted, preferably in hidden relation within the secured areas, and includes circuitry responsive to a UHF signal generated by an identification tag 30 (see FIG. 2) attached to a child or children within secured area 20. The single UHF controller 28 may control a relatively substantial secured area 20. A plurality of high frequency antenna receivers 32, each with a suitable antenna 32A, may be coupled to controller 28 and distributed throughout secured area 20.

If a tag 30 within secured area 20 is removed from the area or tampered with to avoid security, the UHF signal is generated and detected by one or more of the receivers 32 and transmitted to a controller 28, thereby creating an alarm state.

Controller 28 may have a local alarm unit, which will create a visual and/or audible alarm within the immediate secured area. In addition, it is desirably connected to the central or control station 26, which has an appropriate monitor 34, including an alarm unit. Generally, the various elements are cabled or hard wired, with hidden wiring, for example as shown by cable 34*a*. The wiring may be provided with appropriate security to prevent tampering therewith.

With continued reference to FIG. 1, a door controller 36 is mounted above door 22, and preferably hidden from view within the wall structure. Low frequency receivers 38 and 40 are located adjacent to door 22 to pick up very low frequency (VLF) signals generated by a tag 30 as a monitored child approaches the door 22. Receivers 38 and 40 can be located to maintain response in the event of one attempting to defeat the security by orientating and shielding the movement of a tag 30 in the field of receivers 38 and 40.

Door controller 36 is responsive only to an actual attempt to open door 22 in an unauthorized manner. A suitable switch unit 42 is coupled to door 22 to respond and sense the actual opening or attempt to open door 22. Switch unit 42 may typically be a reed switch having a door mounted member and a fixed wall mounted member as shown, an infrared responsive switch assembly similarly mounted, or any other suitable and desired sensing system, which will generate an appropriate signal to controller 36 upon the initiation and/or actual opening of door 22. Such a condition in the presence of a VLF signal from tag 30 generates an alarm state with the corresponding local alarm condition and preferably a remote alarm signaling. Thus, under an alarm state, the output of controller 36 would transmit a signal via a cable 44 to remote unit 34. In addition, controller 36 may be connected by a cable 46 to a control unit 48 having an alarm unit built therein.

For other exits, such as elevator 24, a separate controller 50 is provided. As FIG. 1 illustrates, controller 50 is coupled by input cables 51A and 51C to a pair of orthogonal low frequency receivers 52A and 52B, respectively, which are suitably mounted to opposite sides of elevator doors 24A. The security system for an elevator unit is also typical of any double door unit to a room or area. Thus, at a double door unit, each set of receivers 52A and 52E includes a vertical and a horizontal oriented receiver, as shown. A door interlock 54 may again be provided and interconnected to controller 50 to respond to the attempt to use elevator 24. In this instance, the response may allow doors 24A to open but prevent closing and therefore operation of the elevator. An elevator door control unit 56 is shown adjacent the elevator and wired to controller 50 and through cable 58 to remote alert unit 34. The control unit 56 includes a suitable alarm and interrelated control.

Figure 2:
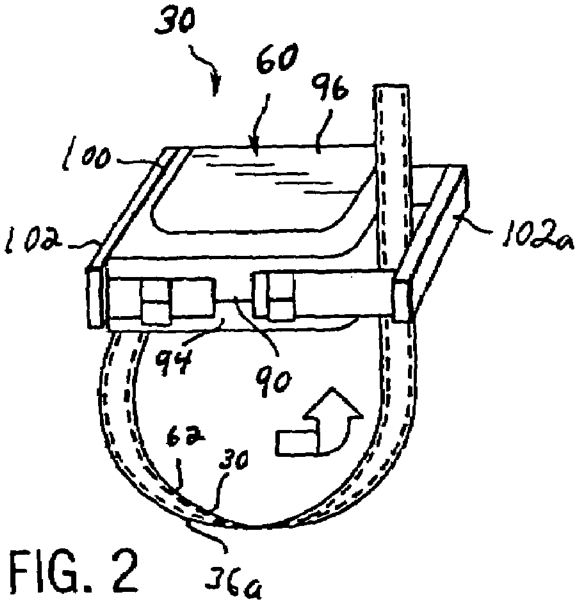
FIG. 2 is a perspective view of a tag unit constructed for releasable attachment with a child's limb.

Referring to FIG. 2, identification tag 30 is attached to the child. Tag 30 includes a transmitter 60, which is operative to generate two distinct radio-frequency (RF) signals, as more fully developed hereinafter. Identification tag 30 is secured to the infant by a strap 62, which is interconnected to the opposite sides of transmitter 60, and is specially constructed to complete the circuitry of the transmitting circuitry within transmitter 60. Although the strap mounted transmitter unit 60 may include any desired structure, the structure preferably includes a mechanical interlock between transmitter 60 and strap 62, with circuit connections to control the transmitting circuitry and sound an alarm with tampering or unauthorized removal of strap 62. Also, as more fully developed hereinafter, tag 30 is conventionally attached to the wrist, or to the leg immediately above the ankle, of the infant and activated to generate the two distinctly different RF signals. In an exemplary construction, transmitter 30 generates a low frequency RF signal, or a VLF signal, for monitoring the exit and entrance of an infant within monitored secured areas 20, and an ultra high frequency signal, or a UHF signal, to monitor any removal or other tampering of the attachment of the transmitter 30 on an infant. Secured areas 20 are provided with appropriate receiving devices for responding to the respective signals, as follows.

Each tag 30 may create a unique encoded VLF signal and the controllers 36, 50 may decode that unique identification and transmit such identification to a local or remote station, such as station 26 (FIG. 1).

Figure 3:
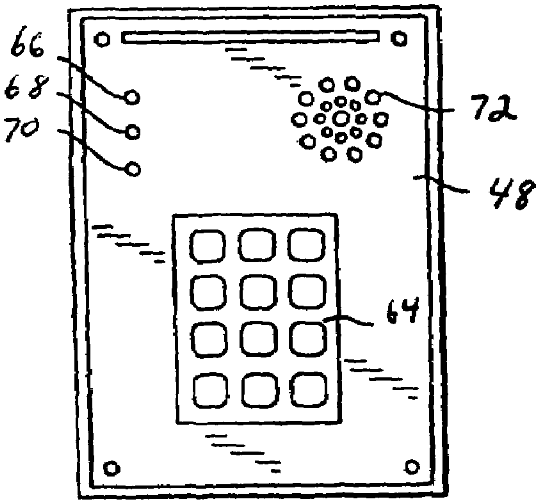
FIG. 3 is an elevational view of a control unit shown in FIG. 1 for monitoring an entrance/exit to the secured area.

FIG. 3 shows a typical local door control unit 48, or 56. Thus, door control unit 48 desirably includes a keypad panel 64 which may be used for entering of a particular code into door unit 48 (and thereby controller 36) by authorized personnel. This arrangement prevents creation of an alarm upon actual opening of the door with the corresponding coded tag unit in the area of the receivers. In addition, door control unit 48 includes status lights, shown as an “on” status light 66, an “active” status light 68, and a “bypass” light 70, the latter indicating that a deactivation code has been entered and accepted. Turn-on of deactivation light 70 permits the opening of door 22, without producing an alarm for a selected short time period, e.g., preset between 5 and 60 seconds. The control unit 48 is diagrammatically illustrated with an audible alarm 72, which is activated in the event of an unauthorized location of tag 30 (FIG. 2) adjacent door 22. As will be apparent to one skilled in the art, unit 56 may be similarly constructed.

Figure 4:
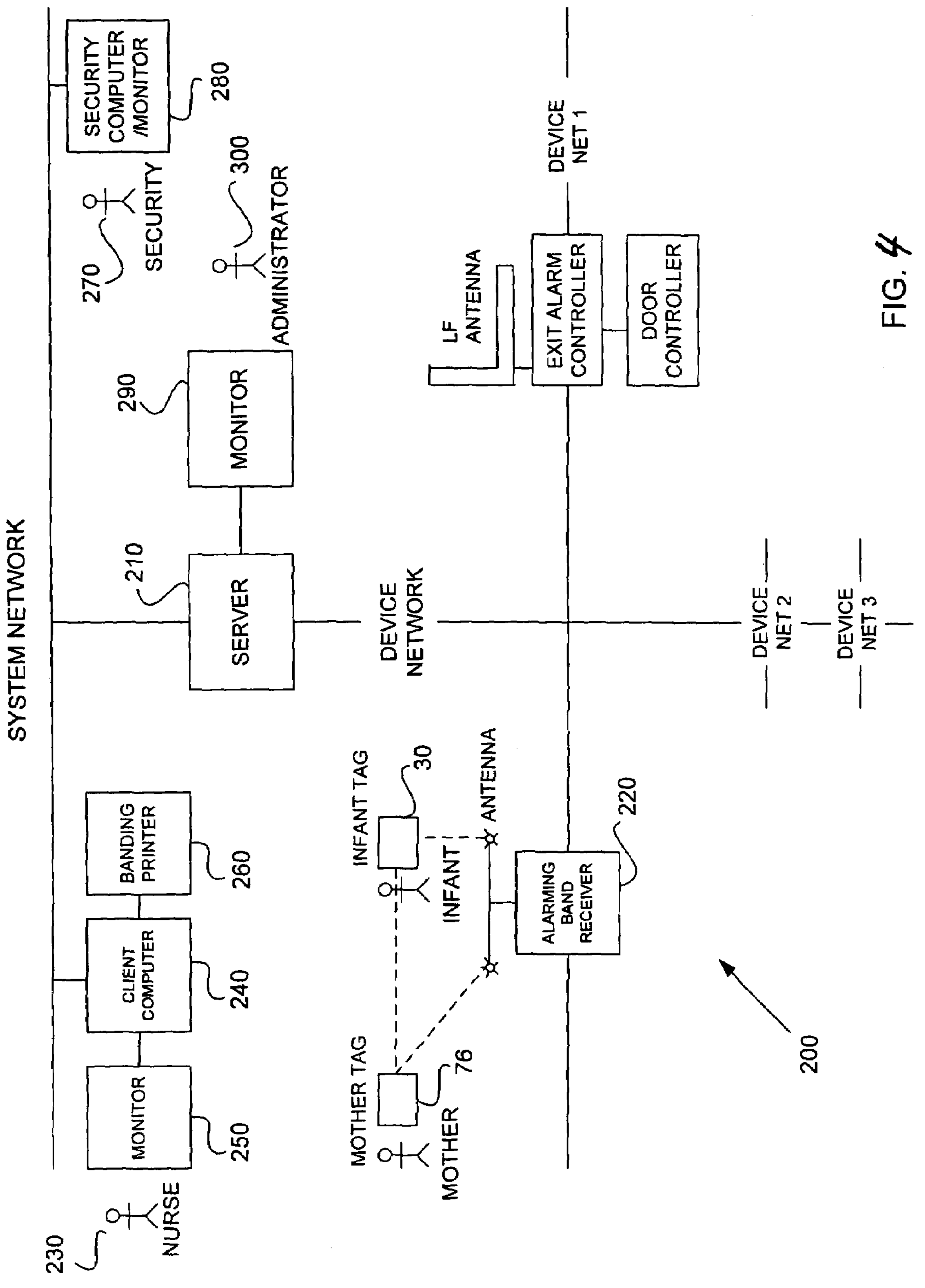
FIG. 4 is an exemplary block diagram of a mother infant matching and security system.

The mother-baby matching system 200 discussed and depicted in FIG. 4 is comprised of two primary components according to an exemplary embodiment, the mother tag and infant tag. The mother tag 76 may be designed to store single, double, or triple infant transmitter(s) numerical ID(s) and be worn by the mother during her stay at the hospital. When placed near an infant transmitter 30 the mother tag 76 receives the ID beacon (LF) from infant transmitter 30 and determines if the tag matches an ID stored in memory. Colored LEDs and a piezoelectric buzzer may be used to indicate whether a successful or unsuccessful match has taken place. Multiple births require the use of twin and triplet mother tags 76 that allow matching to more than one infant. After mother tag 76 is banded (activated), it must be linked to at least one infant tag 30 by reading the ID beacon sent from the infant transmitter 30. The initial read may serve as the linking process. Infant transmitter’s 30 ID(s) may be stored in EEPROM, or other memory, on the mother tag 76 so that they can be used to check for a match during subsequent activations.

A server computer 210 may be used to keep a record of all match events and mother-infant pairs, and display any mother-baby match alarms or warning events. To achieve this functionality, mother tag 76 is equipped with a transmitter circuit that sends data for each cut-band, link, match, mismatch and erase events. The alarming band receivers 220 will receive this data and then pass it on to server 210 on the device network which in an exemplary embodiment may be an RS-485 network using a CA9450 Protocol. Also, according to an exemplary embodiment, 30 minutes after the tag has been removed from a user, the tag erases itself and returns to a hibernated state (deep sleep) to allow reuse.

Figure 7:
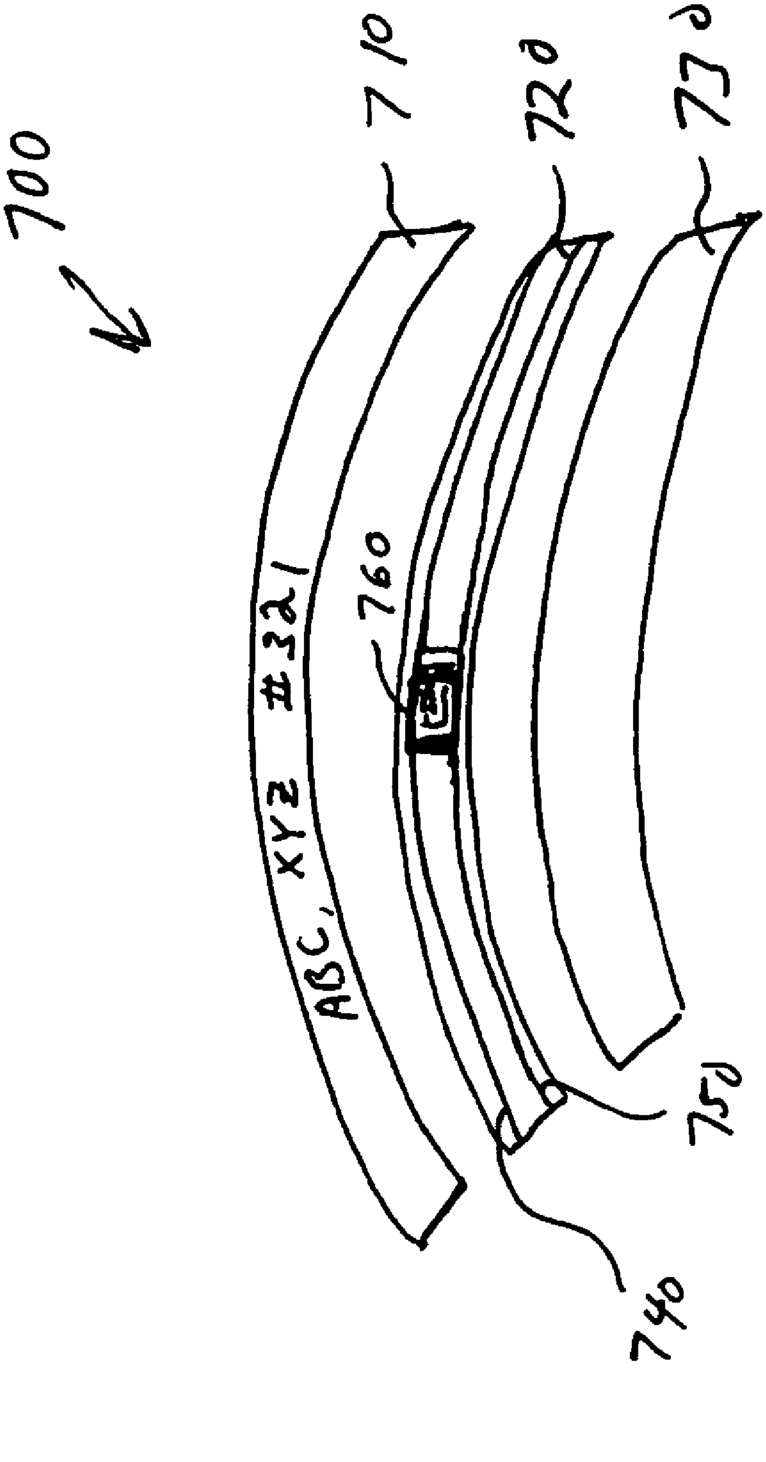
FIG. 7 is an exemplary depiction of layered electronic banding material.

Referring now to FIG. 7, in an exemplary embodiment, the alarm banding material 700 may be configured not to contain latex and/or may be configured to include a hypoallergenic material on all exposed surfaces. The material 700 may contain three layers, including but not limited to a printable layer (such as but not limited to a thermally printable layer) 710, an electronics layer 720, and a hypoallergenic synthetic fiber layer 730. Alternatively, any other materials may be used including latex materials and further including any of a variety of sizes of banding material. In a particular exemplary embodiment, the banding material may have a top surface that is capable of accepting thermal printing which displays in printed form the mother/infant name, patient account number, bar code, doctor, date/time admitted, and room number. The electronic layer may include an RFID chip as well as conductors which connect to the tag device. The conductors may act as the antenna for at least one of the tag device and the RFID device.

Figure 5:
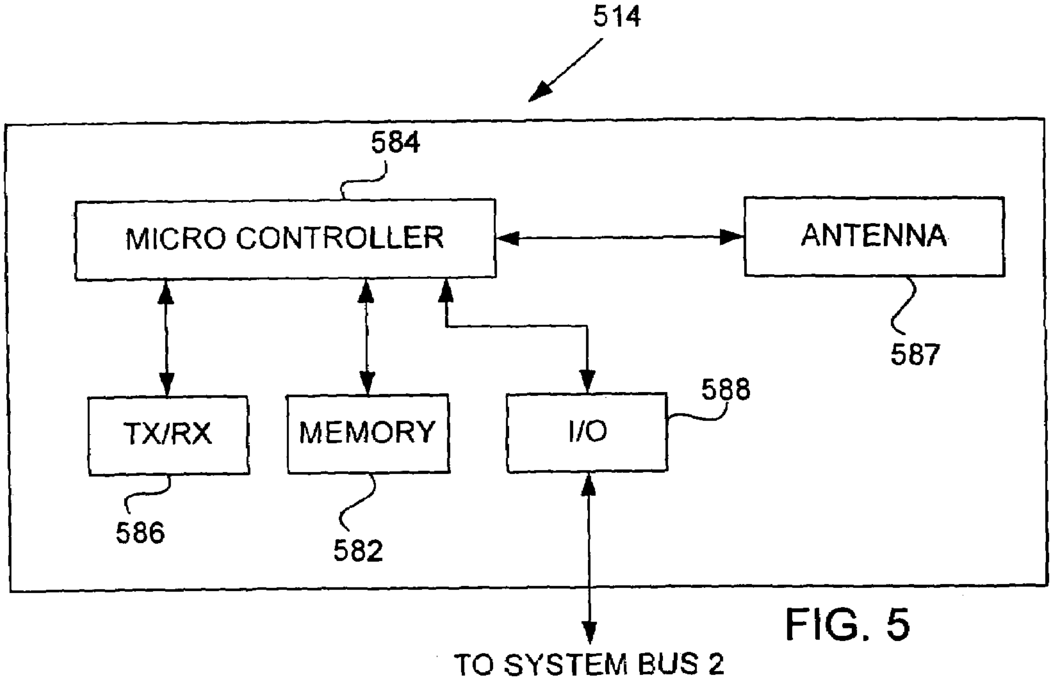
FIG. 5. is an exemplary depiction of a RFID device which may be included in the electronic banding material.
Figure 6:
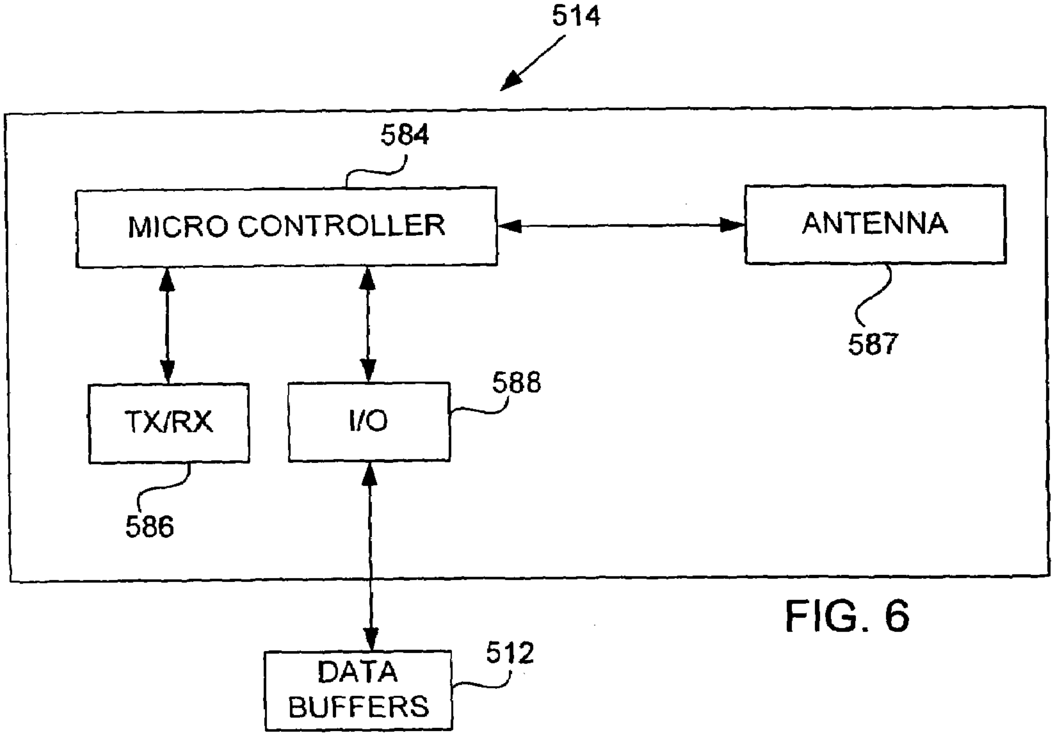
FIG. 6 is an alternative exemplary depiction of a RFID device which may be included in the electronic banding material.

Referring now to FIGS. 5 and 6, two exemplary embodiments of an RFID device 514 are depicted. In FIG. 5, RFID device 514 generally includes a memory 582, a microcontroller 584, an antenna 587, a transmitter/receiver 586, and an input/output ("I/O") section 588. The I/O 588 is coupled to the system bus 2, allowing data to be transferred between the RFID tag 514 and other elements of the device 510 through the system bus 2. The memory 582 may comprise an electronic memory device for storing digital information, a portion of which may be used as a data buffer. The RFID 514 of FIG. 6 generally comprises the microcontroller 584, the transmitter/receiver 586, the antenna 587, and the I/O 588. Instead of a memory being internal to the RFID tag, the I/O 588 may be connected to external data buffers 512. FIGS. 5 and 6 are representative of RFID devices which may be used as RFID devices 760, however any configuration of applicable RFID device may be applied.

A battery operated electronic identification tag connects to electronic banding material to complete a circuit. Typically a person wears the electronic identification tag and electronic banding material around a wrist or ankle; alternatively the tag may be attached to objects. Persons who may wear a tag unit as described may include, but are not limited to emergency room patients, doctors, nurses, technicians, other hospital personnel. Objects which may have a tag attached include but are not limited to blood tags, medication, equipment, food trays, files, etc. The tag unit may be used to locate objects and personnel, sound alarms, measure temperature, provide information regarding attendance of personnel, identify proper blood types or medications, etc.

On an exemplary person worn version the electronic banding material may comprise a hypoallergenic synthetic fabric layer, a passive RFID chip/antenna layer, and a thermally printable layer all bonded together.

The electronic banding material may be printed on and the RFID Chip may be programmed with information prior to banding.

The electronic banding material may be fastened to the electronic tag in two separate places to create a circuit. The completed electronic circuit allows the electronic tag to read/write information to the electronic banding material. The electronic circuit also allows the electronic tag to detect the presence and absence of the electronic banding material. The circuit creating conduction may be used as an antenna for both at lease one of the tag unit and the RFID device. The circuit creating conduction may also be used to sound an alarm if the circuit is severed.

Alternatively, the electronic tag may use RF energy to read/write/detect the electronic banding material.

Additionally, the electronic banding material may be read/write by other devices while banded to the electronic tag.

The electronic tag further transmits and receives to other RF devices whether banded or not. The transmitted information includes the data from the electronic tag and on the electronic banding material as well as the presence or removal of the banding material.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention.

What is claimed is:

1. A mother and infant matching and security system comprising:

a first tag unit adapted to be secured to an infant, the first tag unit being operable to transmit a first signal having a lower frequency for determining removal of the infant from a monitored area and a second signal having a higher frequency for indicating tampering of the first tag unit;

a second tag unit adapted to be secured to a mother of the infant, the second tag unit having a radio communication link with the first tag unit for identifying a match between the mother and the infant;

a communications protocol used by the first tag unit to communicate via the radio communications link with the second tag unit; and a passive radio frequency identification (RFID) circuit coupled to at least one of the first and second tag units, wherein the first signal and the second signal are radio frequency signals, the radio frequency signals having a frequency below the infrared range.

2. The mother and infant matching and security system of claim 1, wherein the radio communications link is established over the lower frequency.

3. The mother and infant matching and security system of claim 2, wherein the lower frequency is in the range of 50 to 300 kHz.

4. The mother and infant matching and security system of claim 1, wherein the RFID circuit is embedded in a banding material of at least one of the first and second tag unit.

5. The mother and infant matching and security system of claim 4, wherein the banding material comprises at least two material layers.

6. The mother and infant matching and security system of claim 1, wherein the RFID circuit is located on a band of the first tag unit.

7. The mother and infant matching and security system of claim 1, wherein the RFID circuit is located on a band of the second tag unit.

8. The mother and infant matching and security system of claim 1, wherein a conductor is embedded in a banding material of at least one of the first tag unit and the second tag unit.

9. The mother and infant matching and security system of claim 8, wherein the conductor acts as an antenna for the RFID circuit.

10. The mother and infant matching and security system of claim 8, wherein the conductor acts as an antenna for the tag unit to which it is attached.

11. A method of identifying two matching persons or objects, the method comprising:

securing a first tag unit to a first person or object, the first tag unit having a transmitting unit and a passive radio frequency identification (RFID) circuit, the first transmitting unit transmits a first signal having lower frequency for determining removal of the first person or object from a monitored area and a second signal having a higher frequency for indicating tampering of the first tag unit, wherein the first signal and the second signal are radio frequency signals, the radio frequency signals having a frequency below the infrared range;

securing a second tag unit to a second person or object, the second tag unit having a radio communication link with the first tag unit;

communicating using a predefined communications protocol from the first tag unit to the second tag unit via a radio communications link; and identifying a match of the first tag unit and the second tag unit based on the radio communications link.

12. The method of claim 11, further comprising:

providing information relating to the person or object to the RFID circuit for storage therein.

13. The method of claim 11, wherein the first object or person is a unit of blood.

14. The method of claim 11, wherein the first object or person is an infant.

15. The mother and infant matching and security system of claim 1, further comprising:

a first communications network over which the communications protocol operates;

a server coupled to the first communications network and;

a tag unit receiver coupled to the first communications network; for communicating with the first and second tag units wherein the tag unit receiver receives data from at least one of the first tag unit and the second tag unit.

16. The mother and infant matching and security system of claim 15, further comprising a circuit, the circuit being radio frequency identification (RFID) integrated into a banding material of the first tag unit.

17. The mother and infant matching and security system of claim 16, wherein the RFID unit stores information related to the infant.

18. The mother and infant matching and security system of claim 16, wherein the banding material may be printed.

19. The mother and infant matching and security system of claim 1, wherein one of the first and second tag unit comprises: a transmitting unit for transmitting the first signal and the second signal;

a banding material coupled to the transmitting unit;

a passive radio frequency identification (RFID) circuit coupled to the transmitting unit and the banding unit.

20. The mother and infant matching and security system of claim 19, wherein the transmitting unit recieves signals.

21. The mother and infant matching and security system of claim 19, wherein the banding material comprises at least two layers.

22. The mother and infant matching and security system of claim 19, wherein the RFID circuit is embedded in the banding material.

23. The mother and infant matching and security system of claim 19, wherein the RFID circuit communicates with the tag unit.

24. The mother and infant matching and security system of claim 19, farther comprising a conductor coupled to the banding material to form a banding circuit.

25. The mother and infant matching and security system of claim 24, wherein the conductor acts as an antenna for the transmitting unit.

26. The mother and infant matching and security system of claim 24, wherein the conductor acts as an antenna for the RFID circuit.

27. The mother and infant matching and security system of claim 24, wherein the conductor is used to identify when the banding circuit is broken.

* * * * *